UNITED STATES PATENT OFFICE.

ERNST WIRTH, OF DORTMUND, GERMANY.

PROCESS OF REDUCING AROMATIC NITRO COMPOUNDS.

SPECIFICATION forming part of Letters Patent No. 714,428, dated November 25, 1902.

Application filed June 13, 1902. Serial No. 111,585. (No specimens.)

*To all whom it may concern:*

Be it known that I, ERNST WIRTH, manufacturer and doctor of philosophy, a subject of the German Emperor, and a resident of 37 Hohenzollernstrasse, Dortmund, Germany, have invented new and useful Improvements in Processes for the Reduction of Aromatic Nitro Compounds Containing Two or More Nitro Groups, of which the following is a specification.

While the reduction of simple aromatic nitro compounds to amins is easily effected by means of metals, acids, or alkalies and while the amins thus formed can easily be separated from the metallic compounds, especially by distillation, the reduction of the more complicated nitro compounds requires in most cases a continued interaction of the reducing agents. The separation of the non-volatile amins is also difficult and can be successfully carried out only by a series of operations which involve a large consumption of chemicals as well as considerable loss of substance.

The generally-employed process of reduction with alkali sulfids in alcoholic solution yields with compounds containing two or more nitro groups only nitro-amido compounds as a consequence of partial reduction.

The reduction by boiling with aqueous solutions of the alkali sulfids, as has been recommended for dinitrostilbene, yields satisfactory results with that body; but it is not suitable for other substances. For instance, with dinitrocarbazole, working after this process, thirty per cent. of the calculated quantity of diamido carbazole only are obtained, while forty per cent. are not attacked at all, and the remainder is obtained as nitro-amido compound, which can be precipitated by water from its solution in concentrated hydrochloric acid. With dinitrodiphenylamin seventy-two per cent. of the diamido compound are obtained. The remainder is otherwise decomposed and cannot be reduced completely, not even by a renewed interaction of the reducing agent.

Now I have found that the reduction with alkali sulfids containing water takes place without any further addition of water at temperatures above 110° centigrade considerably better and at 150° to 170° centigrade quite easily and in a very short time. Most suitable for this purpose is the crystallized sulfid of sodium, ($Na_2S+9H_2O$,) the quantity required for reduction corresponds to the equation:

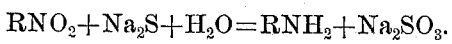

$$RNO_2 + Na_2S + H_2O = RNH_2 + Na_2SO_3.$$

By experiments I established that when dinitrodiphenylamin, ground down with the calculated quantity of the crystallized sodium sulfid, is heated in an open vessel the reaction starts at about 100° centigrade. At 130° the reaction is more energetic and is completed after shortly heating to 150° centigrade, which is evident from the entire solubility in diluted hydrochloric acid. Of dinitrocarbazole ten per cent. are left unreduced by this reaction; but complete reduction takes place even in this case when the temperature is raised to 160° to 170° and when closed vessels are used. The latter precaution is recommended also with the other nitro compounds, as thus the drying up of the mass is prevented. A formation of nitro-amido compounds has in no case been observed. Derivates—as, for instance, salts of sulfonic acids—can also be reduced by this process; but the process is not suitable for nitronaphthalenes, as these are already at a low temperature otherwise decomposed by alkali sulfids.

On a large scale the reduction is carried out most advantageously by grinding down the nitro compound with the calculated quantity of the crystallized sulfid of sodium or by melting them at about 90° centigrade under stirring and afterward by heating in autoclaves up to 150° to 170° until a specimen is completely dissolved by diluted hydrochloric acid, which point is reached after a very short heating. After cooling the mass is lixiviated with water and dried. In this way the amido base is obtained in the calculated quantity and of sufficient purity for technical use.

Having fully described my invention, what I claim, and desire to secure by Letters Patent, is—

Process for the reduction of aromatic nitro compounds, containing two or more nitro groups, by heating with alkali sulfids, containing water, in open or closed vessels at a temperature above 110° centigrade.

In testimony whereof I have hereunto set my hand in presence of two subscribing witnesses.

ERNST WIRTH.

Witnesses:
 WM. ESSENWEIN,
 PETER LIEBER.